United States Patent [19]

Kurmeier

[11] 3,936,281

[45] Feb. 3, 1976

[54] METHOD AND APPARATUS FOR DEODORIZING WASTE GASES

[75] Inventor: Hans Kurmeier, Hamburg, Germany

[73] Assignee: Sudoldenburger Tierfrischmehl-Anlagengesellschaft, Nordlohne, Germany

[22] Filed: Mar. 27, 1974

[21] Appl. No.: 455,247

[30] Foreign Application Priority Data
Mar. 30, 1973 Germany.......................... 2315911

[52] U.S. Cl. ............................ 55/71; 55/73; 55/89; 55/90
[51] Int. Cl.² .......................................... B01D 47/14
[58] Field of Search .............. 55/84, 233, 90, 85, 89

[56] References Cited
UNITED STATES PATENTS

| | | | |
|---|---|---|---|
| 2,431,455 | 11/1947 | Blanding............................ | 55/90 X |
| 3,122,594 | 2/1964 | Kielback............................ | 55/90 X |
| 3,726,062 | 4/1973 | Hungate et al. .................... | 55/90 X |
| 3,733,778 | 5/1973 | Hungate et al. .................... | 55/90 X |

FOREIGN PATENTS OR APPLICATIONS 6,804,910  5/1959  Germany

*Primary Examiner*—John Adee
*Attorney, Agent, or Firm*—James R. Haller; H. Dale Palmatier

[57] ABSTRACT

A method and apparatus for deodorizing waste gases containing foul-smelling constituents that are chemically decomposable on being washed with aqueous acid formed by dissolving an acid-forming gas, such as chlorine or sulphur, in water and wherein the waste gas is washed with the aqueous acid containing a suspension of one or more alkaline earth metal carbonates, such as magnesium carbonate or calcium carbonate. In a vessel, the carbonate suspension may be sprayed downward at the top, and the waste gases directed upwardly at the bottom. Both the suspension and the gases pass through loose layers of limestone intermediate the top and bottom of the vessel.

6 Claims, 1 Drawing Figure

U.S. Patent   February 3, 1976   3,936,281
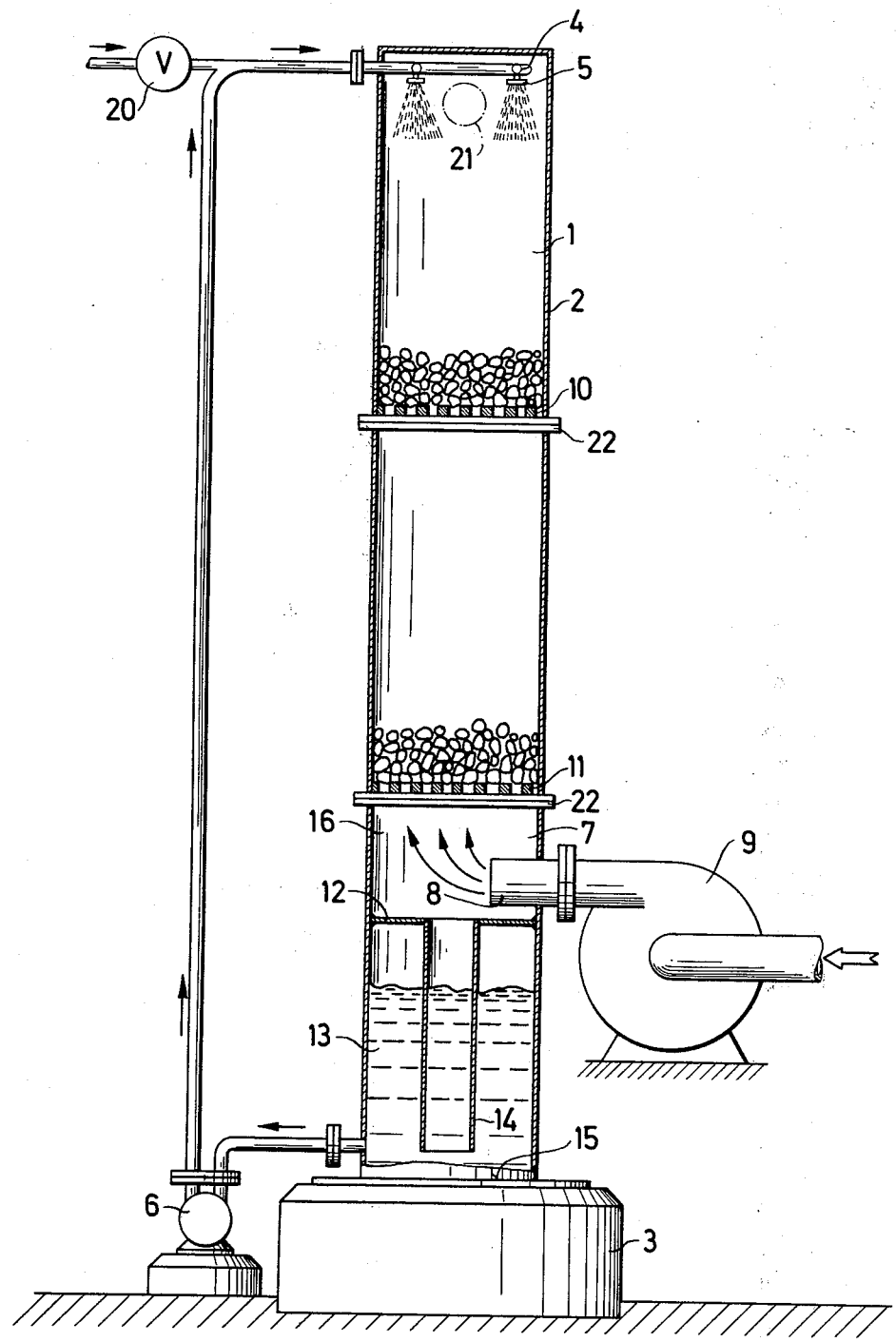

METHOD AND APPARATUS FOR DEODORIZING WASTE GASES

BACKGROUND OF THE INVENTION

Strongly foul-smelling biological waste gases are produced, for example, in animal utilizing plants, fish meal factories, large cattle sheds and where cattle are kept in large numbers. To deodorize waste gas it is known that foul-smelling constituents in the waste gases are often decomposable by being washed with aqueous acid formed by dissolving an acid-forming gas in water. This is particularly true when the waste gas is a biological waste gas as described above. Chlorine and sulphur dioxide are often used as the acid-forming gases, although others can be used.

The normal way of carrying out the process is to mix the waste gases and acid-forming gases with a flowing stream of water in a layer of moist limestone. The desired reaction takes place at the surfaces of the pieces of limestone, the gas mixture passes through the layer of limestone while the salts formed are washed off the limestone by the flowing stream of water.

The process is effective in that biological and other waste gases leaving the limestone layer are practically odorless and ready for discharge into the atmosphere and the materials used in the process are relatively cheap. However, in order to achieve this adequate deodorization, the bed of limestone has to be such that there is considerable pressure loss across it, as a result of which it is necessary to provide powerful, and therefore expensive, pumping apparatus for forcing the gases through the limestone.

SUMMARY OF THE INVENTION

It has been our object to achieve satisfactory deodorization of waste gases while reducing, or eliminating in its entirety, this disadvantage.

According to the invention waste gas containing foul-smelling constituents that are chemically decomposable on being washed with aqueous acid formed by dissolving an acid-forming gas in water are deodorized by washing the waste gas with the aqueous acid containing a suspension of one or more alkaline earth metal carbonates. The carbonates generally used are magnesium or calcium, calcium carbonate being preferred.

Due to the use of carbonates in powder form suspended in water, a large reaction surface is created, so that all the excess acid constituents can be bound to the suspended carbonates.

Moreover, the gas mixture can pass through the suspension without great flow resistance, so that the pressure loss while the method according to the invention is being performed is small. Thus, no large pumping capacity is needed to pass the gas mixture through, so that both the operating and the investment costs can be kept low.

Preferably, in an apparatus for carrying the method according to the invention into effect, distributing nozzles for spraying carbonate suspension are arranged in the upper part of a mixing vessel and a feed pipe for the gases to be deodorized is arranged in the lower part thereof so the liquid and gases pass in counter-current.

Particularly suitable apparatus for carrying out the method of the invention comprises a vessel divided by a grate into a washing zone above a turbulence zone, spray nozzles positioned at the top of the washing zone for spraying aqueous carbonate suspension down through the zone, an inlet for waste gases leading into the turbulence zone and means for forcing waste gas into the turbulence zone through the inlet, an outlet for gas from the top of the washing zone and an outlet for liquid that has descended through the washing zone.

DRAWING

Suitable apparatus is illustrated diagrammatically in the accompanying drawing, comprising, substantially, a section view on a vertical plane.

DETAILED DESCRIPTION

In this, the apparatus consists essentially of an upright cylindrical vessel 1 having a shell 2 and a base 3. Shell 2 may be in several sections, and interconnected by flanges 22. Arranged in the upper part of the cylindrical vessel 1 is a spray ring 4 through which a suspension of carbonate in powder form in water is introduced into the vessel 1 from nozzles 5. This suspension is delivered to the spray ring 4 by a circulating pump 6. It issues from the nozzles 5 with a slight excess pressure and is distributed uniformly in the interior space of the vessel 1. The foul-smelling waste gas enters the turbulence zone 7 of the vessel 1 by way of a pressure connection 8 serving as an inlet, the gas having been drawn off from the premises to be ventilated and supplied to the inlet by means of a waste-gas fan 9. The waste gas ascends through a grate 11 into the washing zone above and mixes with the downward flowing suspension as in a mixing battery and finally escapes from the top of the vessel through any appropriate outlet 21.

For uniform distribution of the suspension and the waste gas over the entire cross-section of the vessel 1, grates 11 and one or more other grates 10, through which both the suspension and the waste gas must pass are provided on two levels or decks. On the grates 10, 11 there are arranged irregular layers of limestone or other granular material forming a loose packing through which the waste gas and the suspension must pass. In the process intimate contact takes place between the suspension and the waste gas on the surfaces of the pieces of limestone.

The suspension trickling down within the cylindrical vessel 1 accumulates on a collecting plate 12 mounted below the inlet 8 and separating the turbulence zone 7 of the cylindrical vessel 1 from a collecting vessel 13 for the suspension. A gas trap 14 extends from the lower part 7 into the collecting vessel 13, the gas trap being in the form of a gravity tube which reaches to a point immediately above the bottom 15 of the collecting vessel 13. In this way it is ensured that the end of the gravity tube constantly has the suspension flowing around it, so that no smells can reach the collecting vessel 13 from the lower part 7 and reach the circulating pump 6 from the collecting vessel.

The suspension of water and carbonates is prepared in a preparing tank, into which a stream of air is passed to stabilize the suspension. From this preparing tank that proportion of carbonates in circulation which is consumed while the method according to the invention is in progress is replenished.

The acid-forming gas may be introduced into the apparatus with the carbonate suspension, as through valve 20, or with the waste gases. If it is introduced with the suspension then the nozzles 5 are usually made of plastic, preferably PVC. Conveniently, one may continuously mix in any suitable preparation unit the acid-forming gases with the aqueous suspension and supply the resultant mixture through suitable piping or other means to the spray nozzles.

In another method, the waste gas may be mixed with acid-forming gas in the turbulence chamber 7 and that may be provided with impingement plates 16 to increase the turbulence and therefore the mixing in the chamber.

Other types of apparatus may be used instead of that illustrated. For example, in some instances it is convenient to use co-current (or parallel) flow of the waste gas and suspension instead of the counter-current flow described.

The purpose of the granular material on the grates 10 and 11 is to provide means for improving the contact between the aqueous suspension and waste gas and so it is not necessary to use limestone. Any other granular material that will give a large surface area can be used. For example, coke is very satisfactory due to its irregular surface.

A suitable acid-forming gas chlorine which, upon being mixed with the water of the suspension, forms hydrochloric acid and hypochlorous acid. The hypochlorous acid gives off nascent oxygen, which destroys the odorous substances. Hydrochloric acid is formed. The whole of the hydrochloric acid formed in these reactions reacts with the carbonates, forming the corresponding chlorides, which are taken up by the water of the suspension. The carbonate therefore operates as an activator by removing the free hydrochloric acid.

Another suitable acid-forming gas is sulphur dioxide and it is convenient to provide this by using flue gas from a boiler. The use of flue gas or other sulphur dioxide-containing gas is particularly useful for eliminating waste gases from animal body utilizing plants. The sulphurous acid, to which the foul-smelling gases are bound as acid salts, is reacted with the calcium or other carbonate to form the corresponding calcium or other salts, which are odorless and remain in the water of the suspension.

What is claimed is:

1. In the deodorizing of waste gas containing foul-smelling constituents that are chemically reactive with an aqueous acid formed by desolving an acid-forming gas in water, the method including the steps of:

moving the waste gas upwardly through a loose bed of granular material supported by a grate in a vessel, the bed providing minimal flow resistance to the moving waste gas, spraying downwardly in the vessel an aqueous suspension of a powdered alkaline earth metal carbonate, the aqueous carbonate suspension trickling downwardly through the bed of granular material in counter-current flow to the simultaneous upward flow of waste gas through the bed and the carbonate suspension providing a large reaction surface, and continuously mixing the acid-forming gas with the aqueous carbonate suspension prior to trickling the latter through the granular material bed.

2. The method according to claim 1 in which the acid-forming gas contains chlorine.

3. The method according to claim 1 in which the acid-forming gas contains sulphur dioxide.

4. In the deodorizing of waste gas containing foul-smelling constituents that are chemically reactive with an aqueous acid formed by desolving an acid-forming gas in water, the method including the steps of:

moving the waste gas upwardly through a loose bed of granular material supported by a grate in a vessel, the bed providing minimal flow resistance to the moving waste gas, spraying downwardly in the vessel an aqueous suspension of a powdered alkaline earth metal carbonate, the aqueous carbonate suspension trickling downwardly through the bed of granular material in counter-current flow to the simultaneous upward flow of waste gas through the bed and the carbonate suspension providing a large reaction surface, and continuously mixing the acid-forming gas and the waste gas prior to moving the latter upwardly through the bed of granular material.

5. The method according to claim 4 in which the acid-forming gas contains chlorine.

6. The method according to claim 4 in which the acid-forming gas contains sulphur dioxide.

* * * * *